US006288356B1

(12) United States Patent
Harder et al.

(10) Patent No.: US 6,288,356 B1
(45) Date of Patent: Sep. 11, 2001

(54) APPARATUS FOR MAKING WELDS THROUGH PARTITIONS IN BATTERY CASES

(75) Inventors: Steven Henry Harder, St. Joseph; Dennis Walter Scygiel, Stevensville; Grant Stanford Goodspeed, Benton Harbor, all of MI (US)

(73) Assignee: Dane Systems, Inc., Stevensville, MI (US)

( * ) Notice: Subject to any disclaimer, the term of this patent is extended or adjusted under 35 U.S.C. 154(b) by 0 days.

(21) Appl. No.: 09/480,292

(22) Filed: Jan. 10, 2000

(51) Int. Cl.[7] .................................................... B23K 11/24
(52) U.S. Cl. ........................................ 219/86.25; 219/116
(58) Field of Search ................................ 219/86.25, 108, 219/116, 90

(56) References Cited

U.S. PATENT DOCUMENTS

| | | | |
|---|---|---|---|
| 3,659,074 | * | 4/1972 | Freiss . |
| 4,320,277 | * | 3/1982 | Taira et al. . |
| 4,841,116 | * | 6/1989 | Kimura et al. . |
| 5,192,850 | * | 3/1993 | Brunn et al. . |
| 5,214,265 | * | 5/1993 | Pollack . |
| 5,589,088 | * | 12/1996 | Boilard . |

* cited by examiner

Primary Examiner—Tom Dunn
Assistant Examiner—Colleen Cooke
(74) Attorney, Agent, or Firm—Price, Heneveld, Cooper, DeWitt & Litton

(57) ABSTRACT

An apparatus for welding that includes a fixture for locating product including a weldable material having a relatively sharp melting point. The apparatus also includes a robot positioned adjacent the fixture and that has a moveable arm and a controller programmable to control movement of the arm, and a welder assembly that includes a mid-frequency DC transformers and a weld mechanism attached to the arm and operably connected to the mid-frequency DC transformer. The weld mechanism includes a pair of opposing weld tips adapted and configured to weld a pair of plates that include the weldable material.

34 Claims, 9 Drawing Sheets

APPARATUS FOR MAKING WELDS THROUGH PARTITIONS IN BATTERY CASES

BACKGROUND OF THE INVENTION

The present invention relates to an apparatus for welding, and in particular to a welder adapted to weld components of a material having a relatively sharp melting point, such as cathodic and anodic lead alloy plates in some types of batteries.

Robotic welders are used in a wide variety of applications to facilitate automated welding in assembly lines. These robotic welders typically include a robot, a welder mounted thereon, and a controller in communication with the robot and controlling the location and movements thereof. However, robotic welders are often not able to position welds as accurate as may be desired due to product variations, locational variations due to inconsistent fixturing, and variations caused by conditions inherent in the robot, such as wear and play in joints and members of the robot's moveable arm. In batteries, this can be problematic since anodic plates (or cathodic plates) in adjacent cells of a battery must be welded together through a hole in a cell-separating wall in a battery casing. If the weld tips are not very accurately located at a center of the hole during welding, the welded material to be welded heats non-uniformly. Since the plates are made of a lead or lead alloy having a relatively sharp melting point, uneven heating of a weld causes "hot" spots to occur that spit and splatter liquid material, while "cool" spots do not weld properly for good electrical contact and current flow.

AC welders have been employed to create welds on the anode or cathode components of a battery. However, there are several problems with AC welders, particularly when used on materials having a sharp melting point where close and accurate control of the welding process is required. For example, AC welders typically use a single phase power that can result in an unbalanced line power. AC welders require a large amperage disconnect switch separating them from the main power supply. AC welders operate on a relatively low power factor, thereby increasing the energy costs associated with running these welders. Also, AC welders typically operate at about 60 Hz making the energy input into the associated weld relatively imprecise, which can prove problematic in precision welding applications. AC welders create a high impedance because of the reversing magnetic fields building and collapsing when operating within the 60 Hz range. Exemplary of this is a typical situation in which a source voltage to the AC welder is about 10 VAC (voltage alternating current), it is considered sufficient when only one VAC is actually supplied to the weld point. This example illustrates the significant voltage loss. Another problem associated with the use of an AC welder is that the reversing magnetic fields as produced in an AC weld secondary loop make the loop sensitive to magnetic materials. When an excessive amount of magnetic material accumulates on the associated clamps and tilling within this loop, the loop will become saturated, resulting in failure to obtain the desired weld current, thereby resulting in an imprecise or uneven weld. Yet another drawback associated with AC weld systems is the size and relative weight of the AC weld system transformer. As an example, an AC weld system transformer capable of delivering 22 kA (kilo amps) weighs approximately 200–300 pounds, which is large, bulky, and difficult to deal with around a robot since the robot requires significant open space to operate. Another problem associated with AC welders is the fact that most metals become magnetic when molten. As a result, the oscillating magnetic field of the AC welder tend to create a condition where the molten metal is expelled from the weld joint, thereby resulting in an inadequate weld joint or contamination of components surrounding the weld joint. Finally, the AC wave form of an AC welder cannot be easily controlled, and therefore it does not allow the fine tuning wanted and necessary in precision welding applications.

Specific to welding processes as associated with the manufacture of batteries, it is often difficult to provide for an exact alignment between the precise location of the battery casing and anodic (or cathodic) components at which point the weld is to be located. One reason is because the rigid construction of the weld heads results in a large weld-tip-holding mechanism and frame that is heavy, massive, and difficult to manipulate with accuracy. More specifically, the rigid construction of the weld heads result in spatial and physical limitations that prevent the weld heads from reacting to correct misalignment conditions between the welding tips of the weld head and the battery components being welded. Further, many welding machines are difficult to access during routine maintenance. Along the same lines, precise fixturing of the battery to be welded is highly important due to the precise nature of the welds in the exact locations thereof.

Accordingly, a welding apparatus is desired solving the aforementioned problems and having the aforementioned advantages, especially for the purpose of robot welding materials having relatively sharp melting points such as lead alloy components used in batteries.

SUMMARY OF THE INVENTION

One aspect of the present invention is to provide an apparatus for welding a product including a weldable material having a relatively sharp melting point, such as lead or lead alloy for a battery, that includes a fixture for locating product to be welded. The apparatus further includes a robot positioned adjacent to the fixture and that has a moveable arm and a controller programmable to control movement of the arm, and a welder assembly including a midfrequency DC transformer and a weld mechanism attached to the arm and operably connected to the mid-frequency DC transformer. The weld mechanism includes a pair of opposing weld tips adapted and configured to weld a pair of plates that include the weldable material.

Another aspect of the present invention is to provide an apparatus for welding a product including a pair of plates that include a weldable material for a cathode or anode, such as a lead or lead alloy for a battery, and that has a casing for a battery, wherein the casing includes a top edge. The apparatus includes a conveyor line that conveys product to be welded. The apparatus further includes a robot positioned adjacent to the conveyor line and that has a moveable arm and a controller programmable to control movement of the arm, and a welder assembly including a weld mechanism attached to the arm. The weld mechanism includes a pair of opposing weld tips adapted and configured to weld the pair of plates, and further includes a fixture shaped to mateably engage the top edge of the casing to accurately locate the battery relative to the casing for welding the weldable material.

Yet another aspect of the present invention is to provide an apparatus for welding a product to be welded that includes a weldable material, wherein the apparatus includes a fixture for positioning a product to be welded, and a robot positioned adjacent the fixture and has a moveable arm and a controller programmable to control movement of the arm. The apparatus also includes a welder assembly that includes a weld mechanism attached to the arm. The weld mechanism includes a mounting plate, a pair of opposing weld tips mounted for linear movement on the mounting plate, and scissor arms pivotally mounted to the mounting plate and operably connected to the weld tips to move the weld tips with a linear motion.

Yet still another aspect of the present invention is to provide a welding mechanism for a welding apparatus, that includes a mounting plate having two oval-shaped apertures extending therethrough, and a pair of opposing welding tips operably mounted for linear movement on the mounting plate and operable between an open non-welding position and a closed welding position. The welding mechanism also includes at least one actuator arm moveable between a first position corresponding to the open non-welding position of the welding tips and a second position corresponding to the closed welding position of the welding tips. The welding mechanism further includes a pair of scissor arms operably attached to the at least one actuator arm and pivotally mounted to the mounting plate at a first point. Each of the scissor arms is operably attached to one of the welding tips and has a pivot boss connected to one side thereof which extends through one of the oval-shaped apertures of the mounting plate, such that the pivot bosses are guided within the oval-shaped apertures of the mounting plate as the actuator arm is moved between the first position and the second position.

These and other features, advantages, and objects of the present invention will be further understood and appreciated by those skilled in the art by reference to the following specification, claims, and appended drawings.

DETAILED DESCRIPTION OF PREFERRED EMBODIMENT

Figure 1:
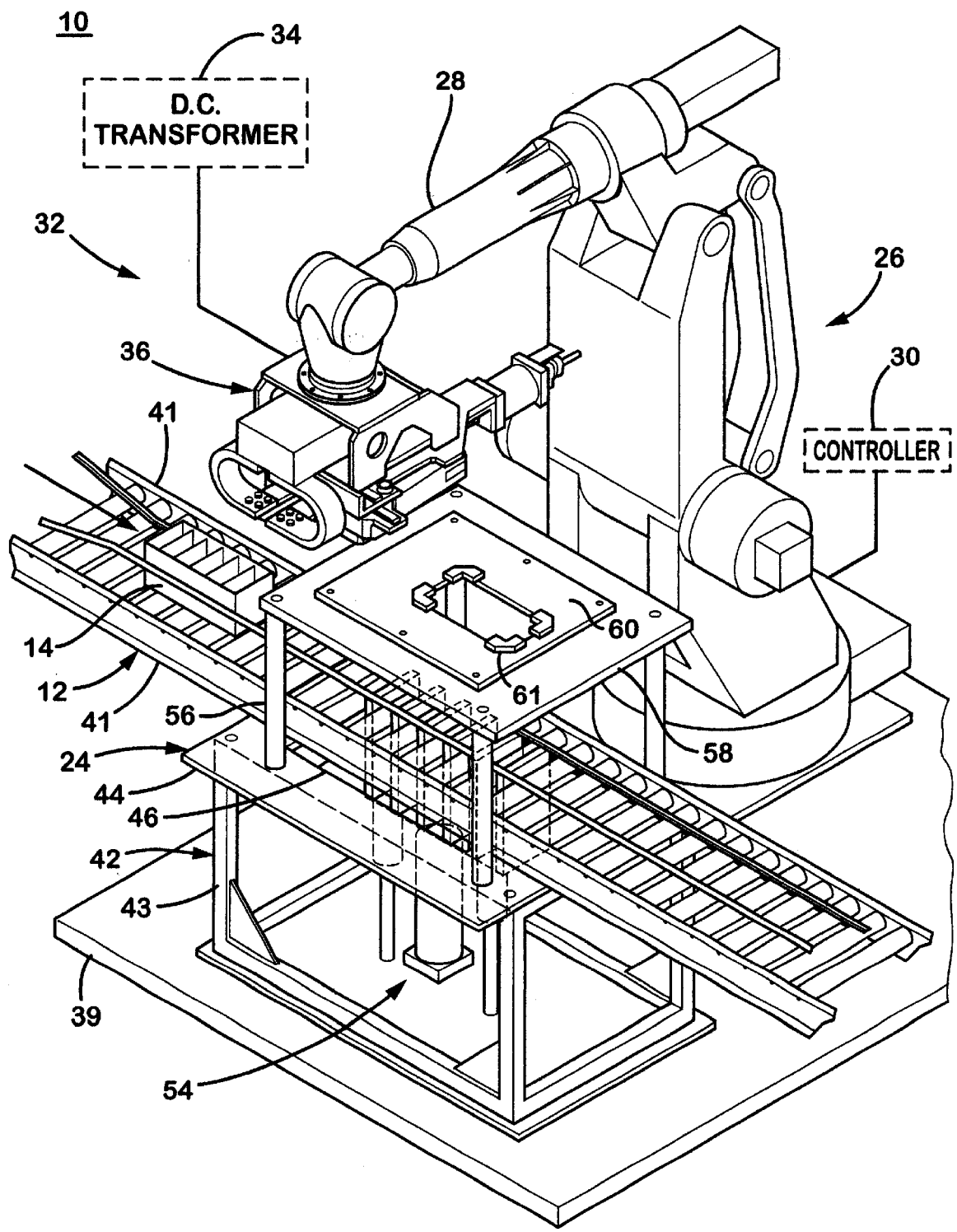
FIG. 1 is a perspective view of the welding apparatus embodying the present invention.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
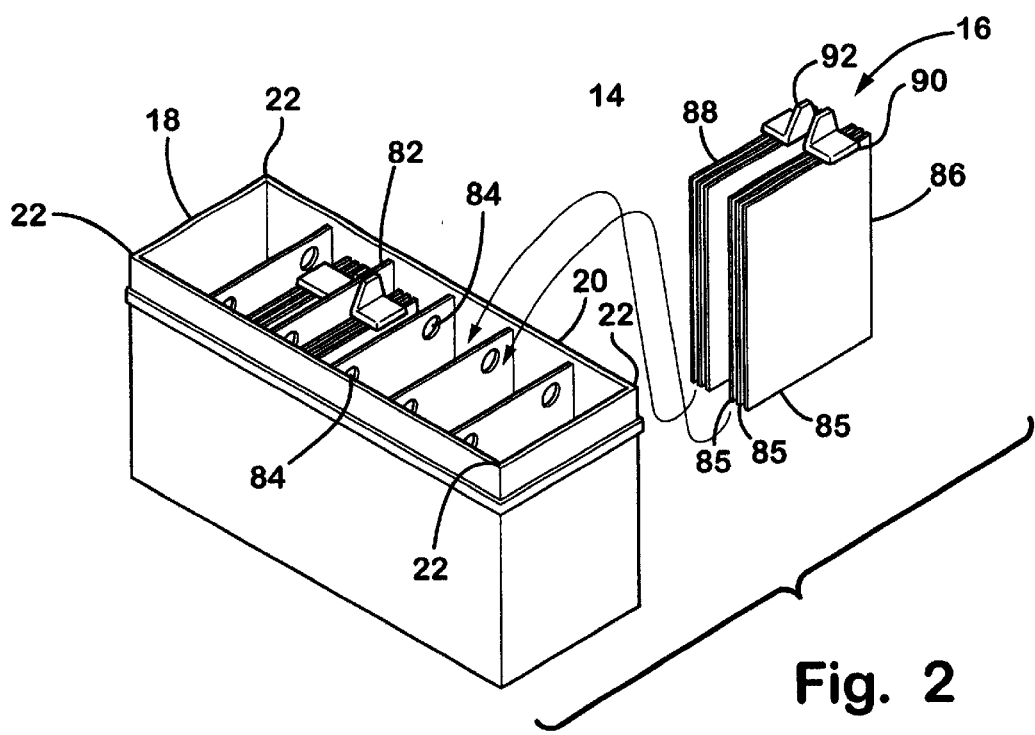
FIG. 2 is a perspective view of a battery shown with a set of plates exploded therefrom.

The reference numeral 10 (FIG. 1) generally designates a welding apparatus embodying the present invention. In the illustrated example, welding apparatus 10 includes a conveyor line 12 conveying product to be welded. The product is a battery 14 (FIG. 2) that includes a plurality of plates 16 that each include a weldable material for a cathode or anode, such as lead or lead alloy. Battery 14 also includes a battery casing 18 having a top edge 20 and a plurality of corners 22. Although the present invention is described in relation to welding a battery, welding apparatus 10 may be employed to weld any product that requires a high precision weld, and/or a product that includes weldable material having a relatively sharp melting point, thus making a high precision weld difficult. In the illustrated example, battery 14 includes a weldable material having a relatively sharp melting point, such as lead or a lead alloy. Welding apparatus 10 further includes a robot 26 that is positioned adjacent fixture 24 and that has a moveable arm 28 and a controller 30 programmable to control movement of arm 28. Welding apparatus 10 also includes a fixture 24 for locating battery 14 to welded. Welding apparatus 10 further includes a welder assembly 32 in communication with a mid-frequency DC transformer 34 and a weld mechanism 36 which is attached to arm 28 of robot 26 and operably connected to the DC transformer 34. Weld mechanism 36 includes a first weld tip 38 (FIG. 3) that opposes a second weld tip 40, each of which are configured to weld plates 16.

Conveyor line 12 includes two opposing track members 41 and a plurality of rollers 50 adapted to rollably support battery 14 thereon, such that battery 14 can be controllably delivered to fixture 24.

Figure 5:
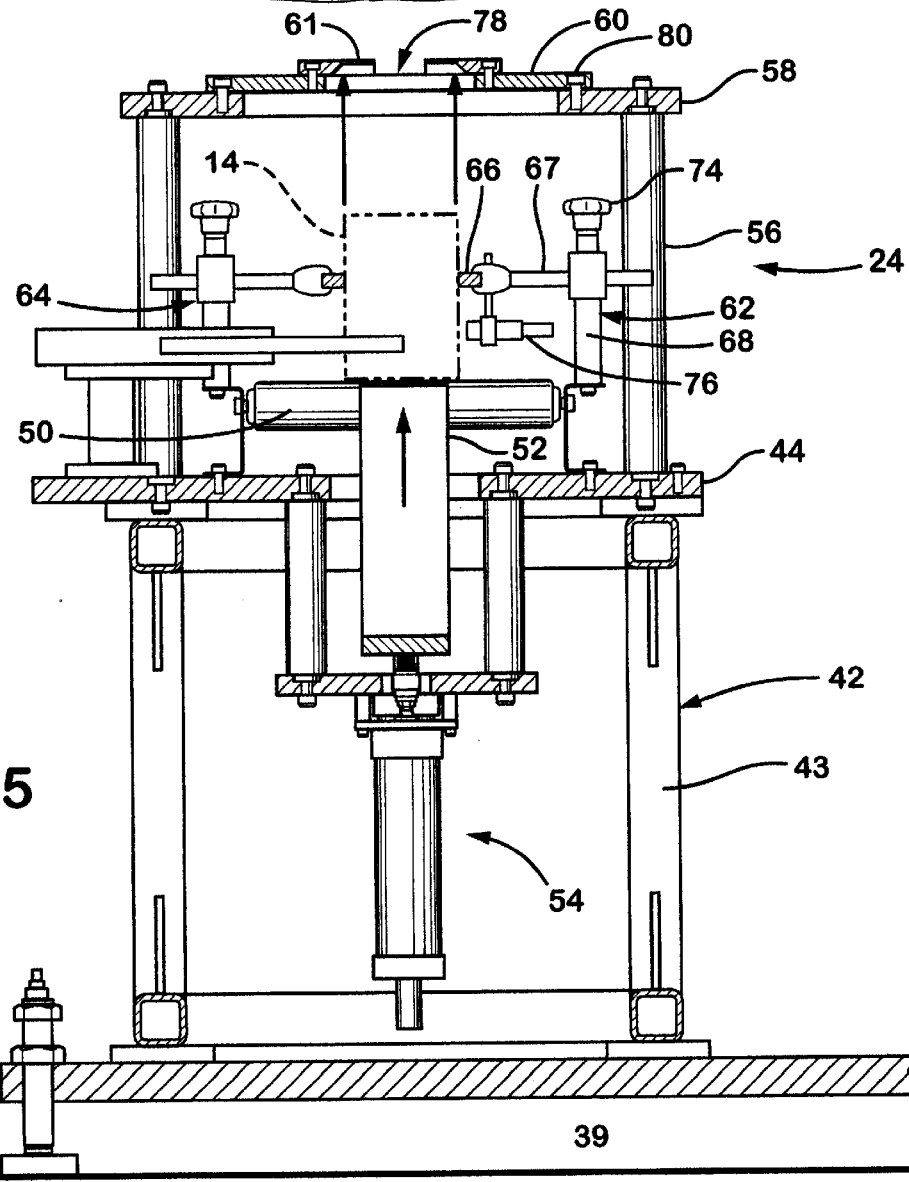
FIG. 5 is a side elevational view of a conveyor and a fixture assembly.
Figure 6:
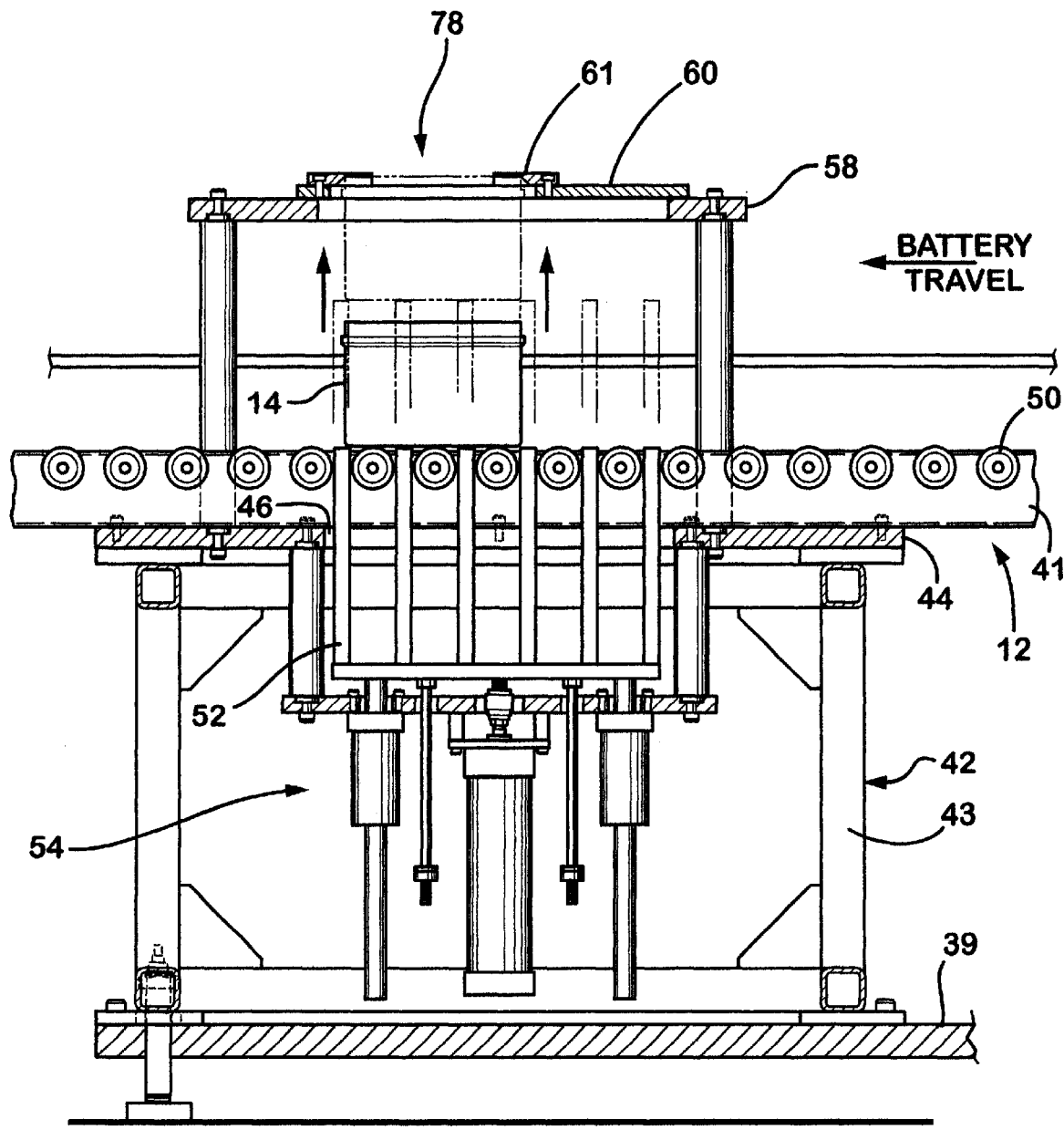
FIG. 6 is a front elevational view of the conveyor.

Fixture 24 (FIGS. 1, 5 and 6) is fixedly attached to mounting plate 39 and includes a lower frame assembly 42 that includes a lower frame 43 and a support plate 44 supported by lower frame 43 and having a centrally located aperture 46 therein. Support plate 44 supports track members 41 thereon. Fixture 24 further includes vertical structural support members 56 that extend upwardly from and are supported by support plate 44. Support members 56 support a top plate 58 above conveyor line 12. Fixture 24 further includes a fixture plate 60 fixedly attached to top plate 58. Top plate 78 includes a centrally located aperture 78 over which fixture plate 60 is mounted by a plurality of mounting screws 80. Aperture 78 is large enough to allow various sizes of batteries to be fixtured within fixture 24 by exchanging fixture plate 60 for a fixture plate having different dimensions. Fixture plate 60 includes four corner locators 61 that are adapted to each securely receive a corner 22 of battery casing 18 therein when battery 14 is located within fixture 24.

Fixture 24 also includes a rack 52 adapted to securely hold battery 14 therein. Rack 52 is attached to hydraulic cylinders 54 that telescopingly travel within aperture 46 of support plate 44 and between rollers 50 of conveyor line 12, and are adapted to raise rack 52 upwardly until battery 14 is fixtured within the fixture 24.

Fixture 24 further includes a first roller 62 and a second roller 64 juxtaposed across conveyor line 12 and which are adapted to align battery 14 above rack 52 as battery 14 travels along rollers 50 of conveyor line 12. Each roller 62 and 64 include a distally located wheel 66 rotatably attached to a shaft 67. Shaft 67 is supported above support plate 44 by a pedestal 68 which includes a set screw 74 which is adapted to exert friction upon shaft 67. Set screw 74 can be loosened to allow shaft 67 to telescopingly slide, thereby allowing the operator to adjust the distance between first roller 62 and second roller 64 for batteries of varying size. Fixture 24 also includes an optical sensor 76 which is in communication with a controller (not shown) and provides input regarding the position of battery 14 within fixture 24.

In the illustrated example, battery 14 (FIG. 2) is provided with a rectangular box-shape. However, it should be noted that batteries of various sizes and shapes can be welded by welding apparatus 10. Battery 14 further includes a plurality of laterally extending partitions 82 located within battery casing 18. Each partition 82 is provided with two apertures 84 which are located near an upper end of each partition 82. Plates 16 are of similar shape and size to partitions 82, and include multiple layers of thin plates 85 that are constructed of lead alloy material. Each pair of plates 16 as welded together can serve as either an anode or cathode within battery 14. In the illustrated example, plates 16 include a first plate 86 and a second plate 88. First plate 86 is provided with a tab 90 located such that tab 90 is positioned over an aperture 84 of a partition 82 when first plate 86 is placed within battery casing 18. Second plate 88 is provided with tab 92 that is located such that tab 92 is located over the same aperture 84 that tab 90 of first plate 86 is located over when second plate 88 is placed within battery casing 18 and juxtaposed across the partition 82 from first plate 86.

Welder assembly 32 utilizes a weld controller (not shown) which uses a three phase, 480 VAC, 60 Hz power source, and plurality of transistors that allow engagement in high speed switching to produce an AC square wave form current. The voltage and amperage generated at first and second weld tips 38 and 40 are controlled by regulating the wave form. The frequency used to generate the weld is determined by the DC transformer 34 and can vary from 500 to 4,000 Hz. Using the weld controller, the user can identify the frequency of the weld transformer and regulate the output as necessary. The current from the weld controller is directed through a compassator bank and then to the transformer, where it is rectified as midfrequency direct current. This current passes through first weld tip 38 and second weld tip 40 to complete the weld.

There are several advantages to using a mid-frequency DC welder rather than using an AC welder. The weld process of the DC welder utilizes three phase power rather than single phase power utilized by traditional AC welders, thereby resulting in a more balanced line power. The DC welder only requires a 50 ampere disconnect switch, which is significantly smaller than the amperage disconnect switches required by AC welders. The DC welder operates at about a 95% power factor, which is significantly higher than comparable AC welders. The weld controller as utilized within welding apparatus 10 can regulate the output weld by identifying the frequency of the weld transformer 34 being used. The weld controller further provides high current resolution at over 1,000 Hz, which is much greater than that which can be provided by AC welders, thereby making the energy input and the resulting weld more precise. DC welders do not create reversing magnetic fields which result in a high impedance. The high impedance of AC welders results in a significant voltage loss between the source voltage and the actual voltage supplied to the weld point. In a DC welder, the source voltage is nearly identical to the voltage supplied to the weld point. As a result, the DC welder can perform the same welds as an AC welder but require less input power and in some instances can make welds where AC welders cannot. Also, mid-frequency DC weld current is not affected by secondary loop magnetic material accumulation as is the case with comparable AC welders.

Another advantage of the DC welding system is the associated weight and size. In the present example, the DC transformer 34 of welder assembly 32 weighs approximately 35 pounds, making it ideal for robotic use. Comparable AC weld transformers, capable of delivering the required power for providing the high precision welds are required in the present example, weigh approximately 200–300 pounds. The smaller size of DC transformer 34 as compared to comparable AC weld system transformers enable the DC transformer 34 to be positioned close to the point of the weld. Still another advantage of the mid-frequency DC welder is the decrease in the likelihood of the expulsion or splattering of molten metal from within the well joint, as compared to comparable AC welders which generate oscillating magnetic fields which in turn create a condition where molten magnetic metal is expelled from the weld joint. The precise heat input of the mid-frequency DC weld system, combined with low impedance provides a process that is far less sensitive to process parameters.

Another advantage of the mid-frequency DC controller is that the controller has the ability to measure the output of the power generated through the weld point and compare that output to a specific range to determine whether the weld is satisfactory. Further, the weld controller can be programmed to compensate for wear of weld tips 38 and 40 and possible contamination thereof, therefore making routine replacement of weld tips 38 and 40 less necessary. Finally, the mid-frequency DC welder has a wave form that can be controlled in sensitive applications. Such control cannot be easily accomplished with an AC welder.

Figure 7:
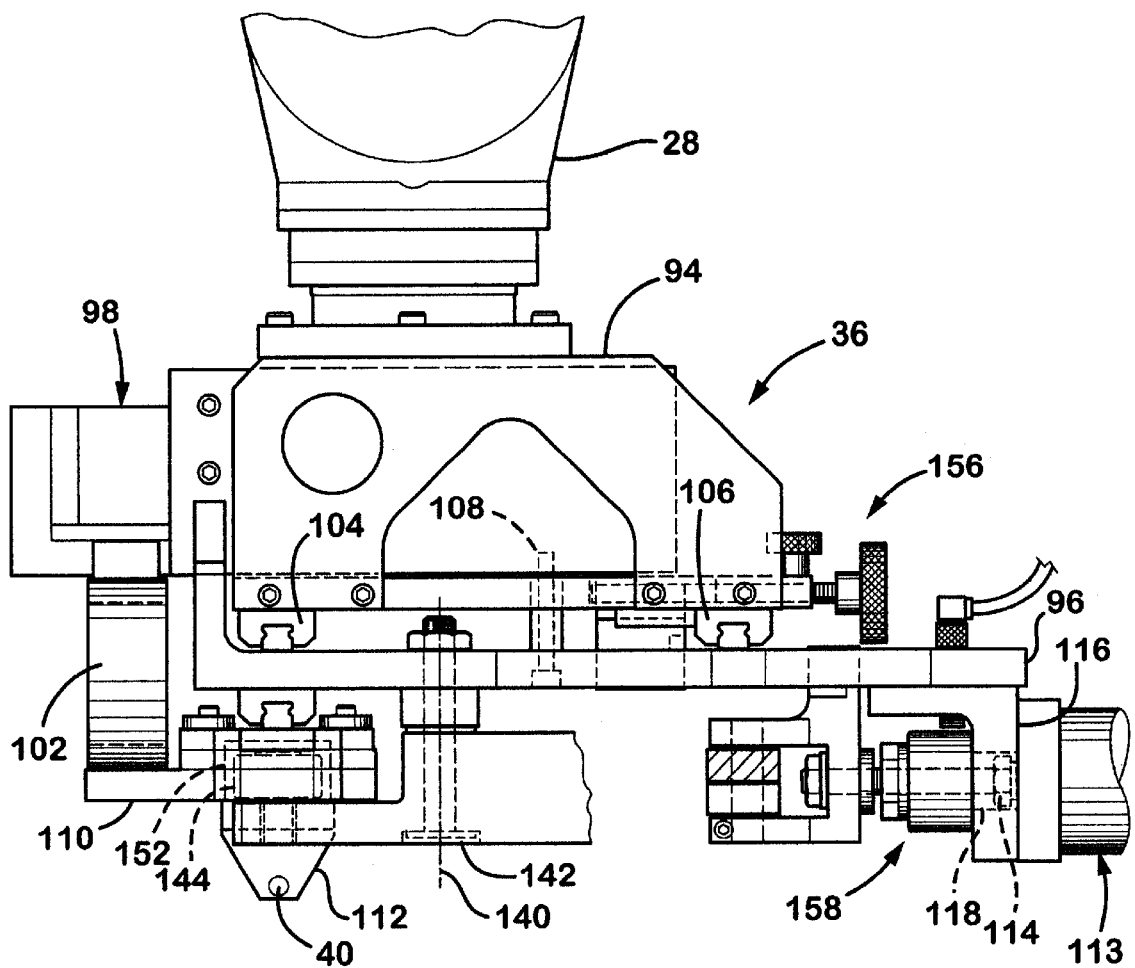
FIG. 7 is a side elevational view of a weld mechanism.
Figure 8:
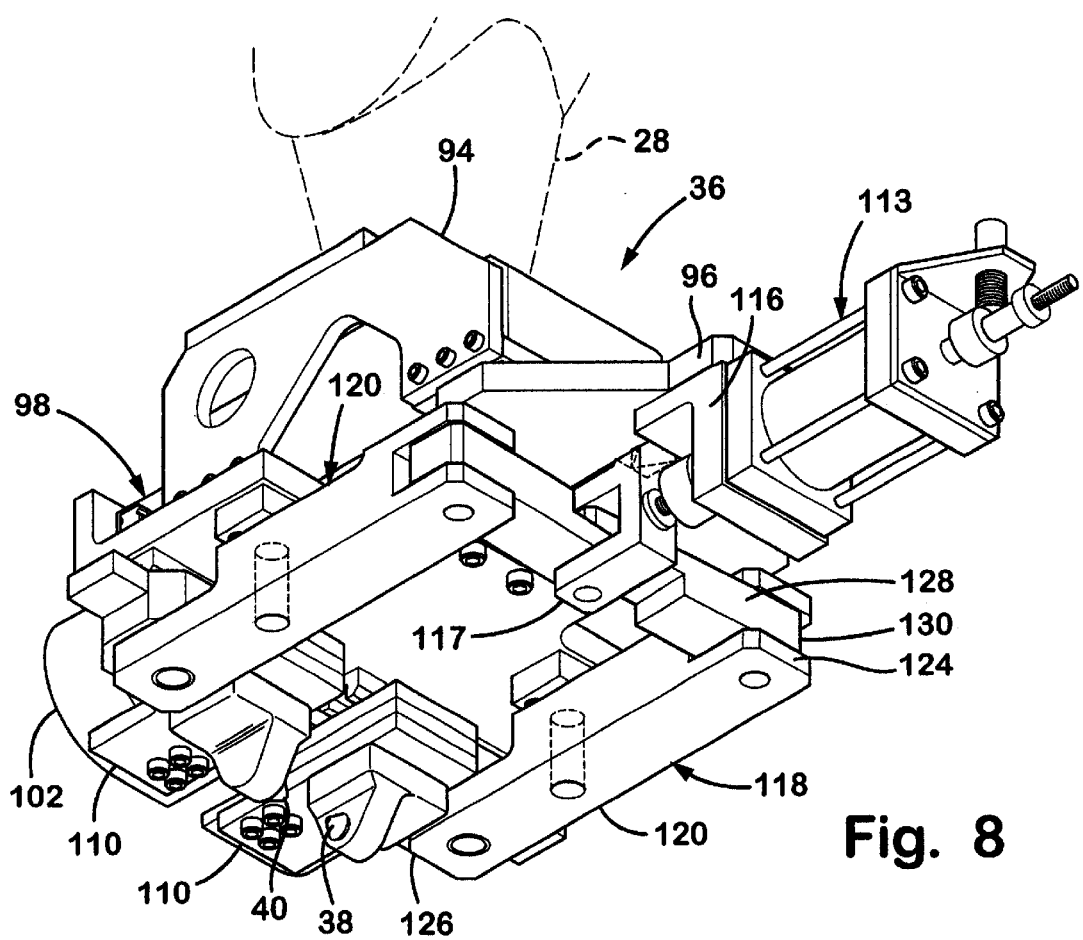
FIG. 8 is a bottom perspective view of the weld mechanism.

Weld mechanism 36 (FIGS. 7, 8 and 10) of weld assembly 32 includes a box-shaped support assembly 94 which is supported by and fixedly attached to arm 28 of robot 26. Support assembly 94 supports a main plate 96 which is attached to an underside of support assembly 94 by way of a first set of slides 104 and a second set of slides 106 which allow lateral adjustment of main plate 96 with respect to support assembly 94. A plurality of bolts 108 restrict main plate 96 from being adjusted with respect to support assembly 94 when tightened.

Support assembly 94 also supports a power coil assembly 98 which is attached to a front side of support assembly 94 and which includes a first power coil 100 and a second power coil 102. First power coil 100 and second power coil 102 are in electrical communication with first weld tip 38 and second weld tip 40, and supply power from DC transformer 34 thereto.

First and second welding tips 38 and 40 are supported within a pair of receiving blocks 110 (FIG. 10) and are in communication with first and second power coils 100 and 102. Receiving blocks 110 are each provided with a triangularly-shaped weld head 112 which is adapted to receive welding tips 38 and 40 therein. Welding tips 38 and 40 are each water cooled.

Weld mechanism 36 also includes a hydraulic actuator cylinder 113 which includes an actuator arm 114 that telescopingly extends therefrom. Actuator 114 includes an end 115, at least a portion of which is threaded, and which includes a clevis 117 attached thereto. Clevis 117 is provided with an upwardly extending triangularly shaped stop 119. In assembly, stop 119 fits within a rectangularly shaped aperture 121 located within main plate 96. Actuator cylinder 113 is supported by an L-shaped bracket 116 that is fixedly attached to main plate 96, and which has an aperture 118 located therein through which actuator arm 114 of actuator cylinder 113 travels. Although actuator cylinder 113 has been described as a hydraulic cylinder, it should be noted that any suitable means of power can be used including, but not limited to, pneumatic and mechanical. Actuator arm 114 is moveable between a first position wherein actuator arm 114 is extended from within actuator cylinder 113 and a second position wherein actuator arm 114 is retracted within actuator cylinder 113.

As illustrated in FIGS. 8, 9, 12 and 13, actuator mechanism 36 further includes a first actuator scissor arm 118 and a second actuator scissor arm 120. First scissor arm 118 is a substantially mirrored construction of second scissor arm 120, therefore the following description of first scissor arm 118 is descriptive of both scissor arms 118 and 120. First scissor arm 118 includes a first arm section 122 having a first end 124 and a second end 126, and a second arm section 128 having a first end 130 and a second end 132. First end 124 of first arm section 122 is pivotally connected to first end 130 of second arm section 128 at a pivot point 134. Second end 132 of each second arm section 128 is located within and pivotally connected to clevis 117 of cylinder actuator 112 at a pivot point 136 by a pivot pin 138. First arm section 122 of first scissor arm 118 pivotally connects to main plate 96 at a pivot point 140 by a bolt 142. Second end 126 of first arm section 122 is provided with an upwardly extending, cylindrically shaped guide boss 144.

Weld mechanism 36 further includes a first guide block 146 and a second guide block 148. Guide blocks 146 and 148 are attached to an underside of main plate 96 by a plurality of slidable tracks 150 which allow for lateral movement of guide blocks 146 and 148 relative to main plate 96. Each guide block 146 and 148 is provided with an elongated aperture 152 extending therethrough and which is adapted to receive one of the guide bosses 144 therein. In assembly, guide bosses 144 are located within apertures 152 within which guide bosses 144 can translate as well as rotate or pivot. Each receiving block 110 of power coil assembly 98 is attached to an underside of one of the guide blocks 146 and is insulated therefrom by an insulator 154.

Figure 3:
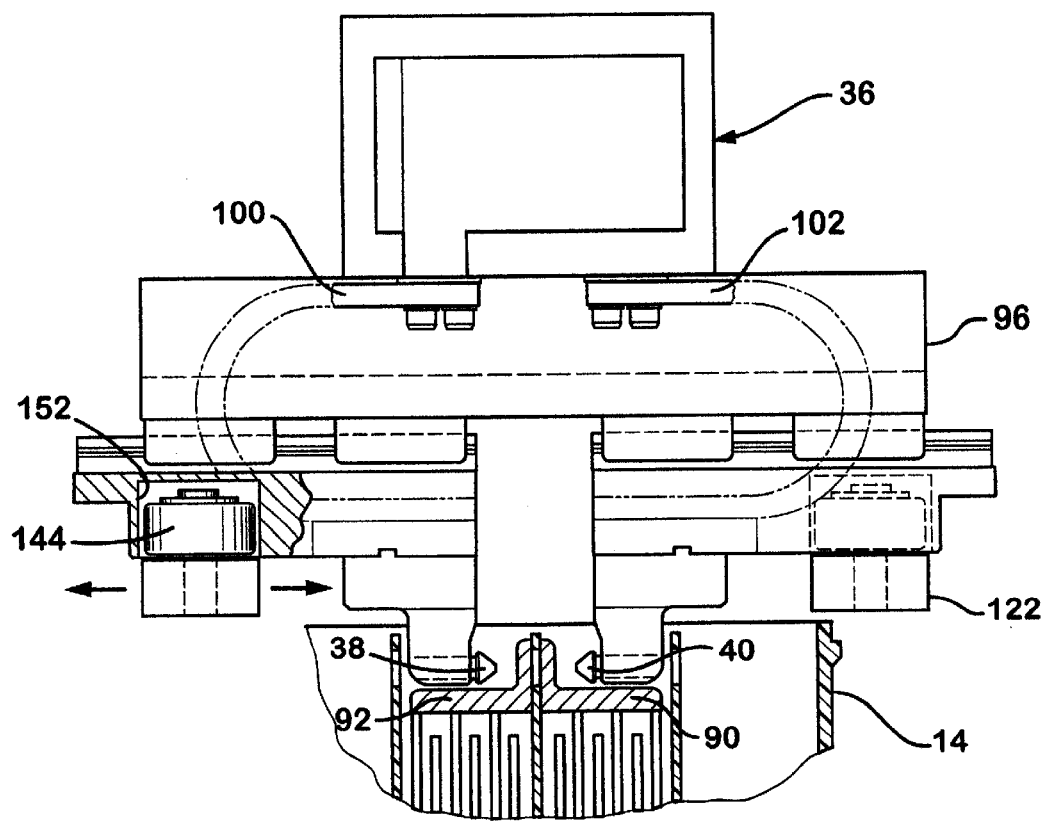
FIG. 3 is an enlarged, front elevational view of a welder assembly with the welding tips shown in an open, non-welding position.
Figure 4:
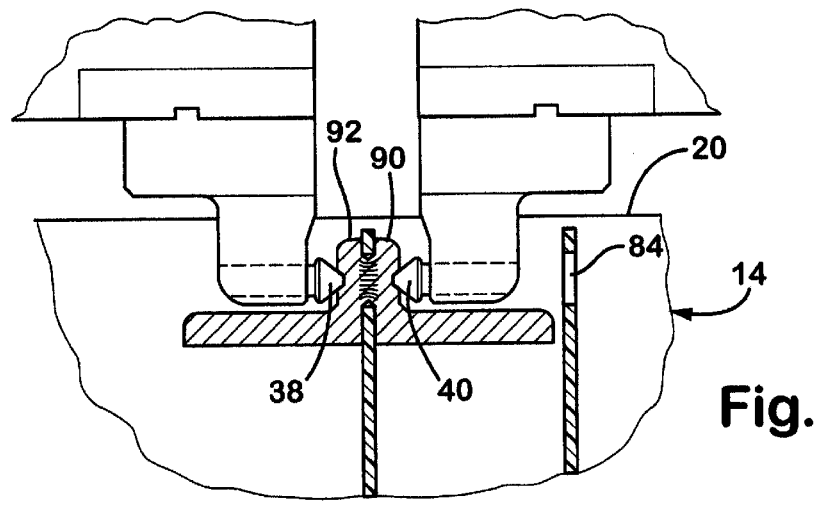
FIG. 4 is an enlarged, front elevational view of the welding tips shown in the closed welding position.
Figure 12:
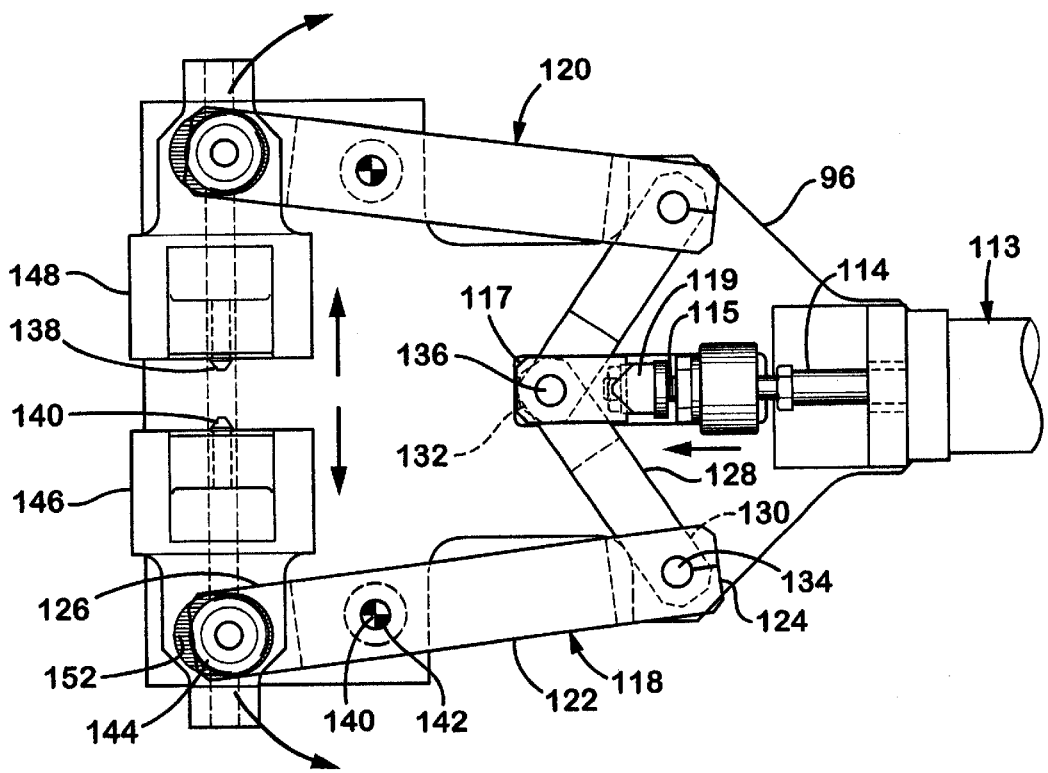
FIG. 12 is a top plan view of a pair of actuating scissor arms shown in the open nonwelding position.
Figure 13:
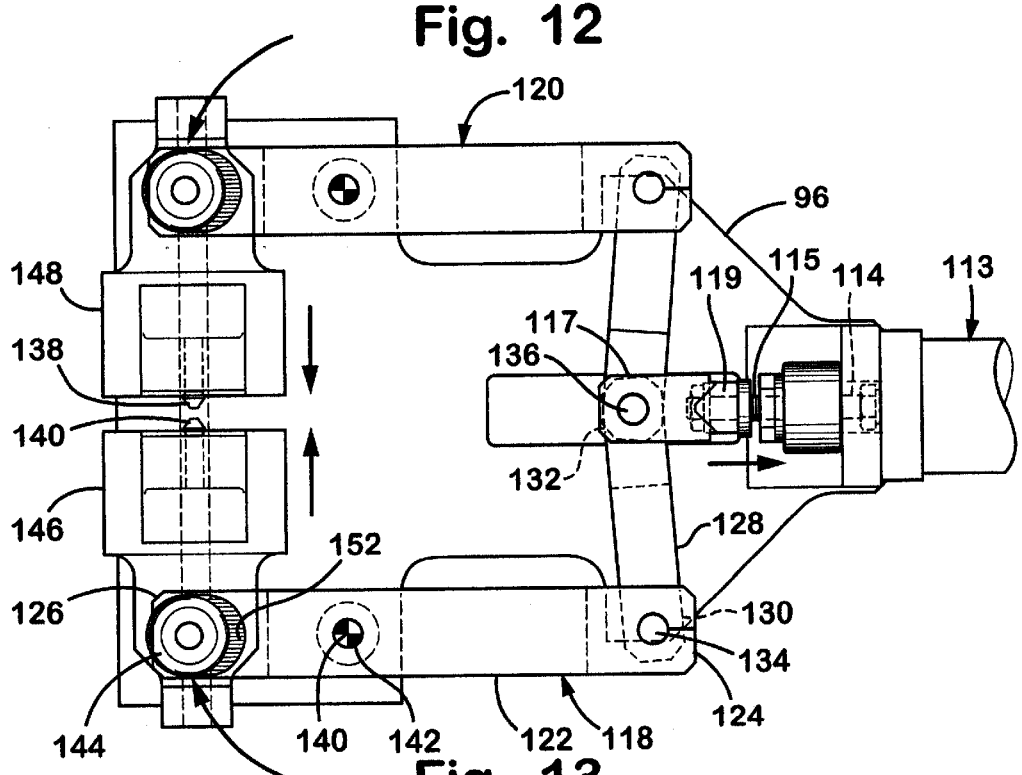
FIG. 13 is a top plan view of the scissor arms shown in the closed welding position.

In operation, weld tips 38 and 40 move linearly between an open, non-welding position as shown in FIGS. 3 and 12, and a closed, welding position as shown in FIGS. 4 and 13, as guide blocks 146 move linearly along tracks 150. More specifically, the product to be welded, such as battery 14, travels along conveyor line 12 until it is within the proper location within fixture 14 as can be sensed by optical sensor 76 of fixture 14 and relayed to a central controller. Rack 52 of fixture 14 then lifts battery 14 upward from conveyer line 12 by way of cylinders 54 until top edge 20 of battery casing 18 is located within fixture plate 60 and corners 22 of battery casing 18 are fixtured within corner locators 61. The fixturing of corners 22 within corner locators 61 ensures precise locating of battery 14 with respect to robot 26.

Robot arm 26 then lowers weld mechanism 36 downwardly until weld tips 38 and 40 are located within the interior of battery casing 18 and weld tips 38 and 40 are precisely located over an aperture 84 of battery casing 18. The exact alignment of weld tips 38 and 40 are extremely important in that any misalignment may result in "hot spots" within the weld. This may result in an uneven or unsatisfactory weld and/or in the splattering of molten weld material, particularly in materials that have a relatively sharp melting point such as lead alloys used in batteries, which may cause contamination or damage to parts of the battery. Once weld tips 138 and 140 are properly located over aperture 84, actuator arm 144 is withdrawn into actuator cylinder 113, thereby causing second ends 132 of each second arm section 128 of first and second scissor arms 118 and 120 to pivot about pivot point 136 as stop 119 guides within aperture 121 of main plate 96. As a result, second ends 130 of each second arm section 128 cause first ends 124 of each first arm section 122 to swing outwardly and each first arm section 122 to pivot about the relative pivot point 140. As each first arm section 122 pivots about pivot point 140, second end 126 of each first arm section 122 swings inwardly, thereby moving guide blocks 150 and weld tips 138 and 140 in an inward direction towards the welding position, as guide bosses 144 guide within apertures 152 by pivoting and sliding. The pivoting and sliding action of pivot bosses 144 within apertures 152 allow weld tips 138 and 140 to track in a linear motion. This linear motion results in a more even contact between weld tips 138 and 140 as they come together in the closed, welding position, thus resulting in a more precise, more even weld. The reverse process is executed once the weld, or multiple welds, has been accomplished. It should be noted that the lowering of weld mechanism 36 by robot 26 and the actuation of weld tips 38 and 40 may be performed simultaneously.

Figure 11:
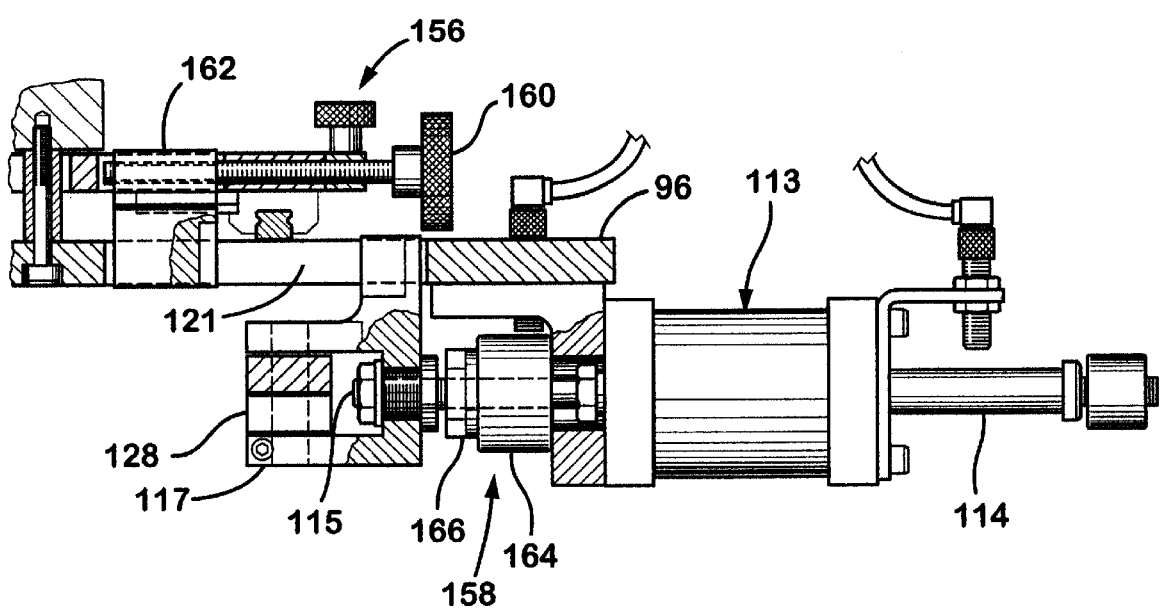
FIG. 11 is an enlarged side elevational view of a first and second adjustment mechanism.

As illustrated in FIG. 11, weld mechanism 36 also includes a first adjustment mechanism 156 adapted to allow adjustment of the position of weld tips 38 and 40 when in the open, non-welding position, and a second adjustment of the position of weld tips 38 and 40 when in the closed, welding position.

First adjustment mechanism 156 includes an adjustment screw 160 which is threadably received within support assembly 94, and an adjustable stop 162 which threadably receives adjustment screws 160 and extends downwardly into aperture 121 of main plate 96. In adjustment, adjustment screw 160 is used to adjust the location of stop 162 within aperture 121. In operation, the travel of stop 119 of clevis 117 within aperture 121 is limited to when stop 162 contacts stop 119, thereby limiting the positions of weld tips 38 and 40 relative to one another when in the open, non-welding position. First adjustment mechanism 156 is useful in applications wherein clearance within the product being welded for weld tips 38 and 40 may be limited.

Second adjustment mechanism 158 includes an adjustment ring 164 that is threadably received upon end 115 of actuator arm 114. Adjustment ring 164 includes an axially located, interiorly located, cylindrically locking portion (not shown) having two longitudinally extending slots (not shown) located therein. A locking ring 166 is threadably received over the locking portion thereby holding adjustment ring 164 in place along actuator arm 114. In operation, the travel of actuator arm 114 is limited by adjustment ring 164 contacting the L-shaped bracket 116, thereby limiting the positions of weld tips 38 and 40 relative to one another when in the closed, welding position. Second adjustment mechanism 158 is useful in adjusting the gap between weld tips 38 and 40 during welding, thereby providing adjustability of the thickness of the resultant weld.

While the present invention has been described in relation to the manufacture of batteries, the welding apparatus described herein is also useful in various applications such as spot welding sheet metal, spot welding various types of alloy sheets, and projection welding sheet steel and various types of alloy steels. The present invention is further useful for spot welding applications requiring high cosmetic finishes, spot welding aluminum, as well as weld applications where difficult joints and/or projections are present, thereby making traditional welding techniques difficult or impossible to use.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The invention claimed is:

1. An apparatus for welding a product including a weldable material having a relatively sharp melting point, comprising:
 a fixture for locating the product to be welded;
 a robot positioned adjacent the fixture and having a movable arm and a controller programmable to control movement of the arm; and
 a welder assembly including a mid-frequency DC taansformer and a weld mechanism attached to the arm and operably connected to the mid-frequency DC transformer, the weld mechanism including a pair of opposing weld tips adapted and configured to weld a pair of plates including the weldable material.

2. The apparatus described in claim 1, wherein the weld tips of the weld mechanism are mounted to move along a linear path.

3. The apparatus described in claim 2, wherein the product includes a battery having a top edge, and wherein the fixture is configured to mateably engage the top edge of the battery to locate the battery relative to the weld mechanism for welding the weldable material.

4. The apparatus described in claim 3, wherein the fixture is configured to mateably engage at least one corner of the top edge of the battery.

5. The apparatus described in claim 4, further including:
 a conveyor in communication with the fixture, such that the battery can be conveyed into a position on the conveyor and then located within the fixture by a powered actuator.

6. The apparatus described in claim 5, wherein the weld mechanism characteristically has a low weight of less than about 100 pounds.

7. The apparatus described in claim 1, wherein the product includes a battery having a top edge and the fixture mateably engages the top edge of the battery to locate the battery relative to the weld mechanism for welding the weldable material.

8. The apparatus described in claim 1, wherein the fixture mateably engages at least one corner of the battery to locate the battery relative to the welder assembly for welding the weldable material.

9. The apparatus described in claim 1, further including:
 a conveyor in communication with the fixture, such that the battery can be conveyed into a position on the conveyor and then located within the fixture by a powered actuator.

10. The apparatus described in claim 9, wherein the powered actuator includes at least one fluid cylinder.

11. An apparatus, comprising:
 a plurality of product units each having at least a pair of plates that include a weldable material for a cathode or an anode, and having a casing that includes a top edge;
 a conveyor line adapted to convey the product to be welded;
 a robot positioned adjacent the conveyor line and having a movable arm and a controller programmable to control movement of the arm; and
 a welder assembly including a mid-frequency DC transformer and a weld mechanism attached to the arm and operably connected to the mid-frequency DC tranformer, the weld mechanism including a pair of opposing weld tips adapted and configured to weld the pair of plates, and including a fixture shaped to mateably engage the top edge of the casing to accurately locate the battery relative to the casing for welding the weldable material.

12. The apparatus described in claim 11, wherein the top edge includes a plurality of corners and the fixture mateably engages at least one of the corners.

13. The apparatus described in claim 12, wherein the weld tips move in a substantially linear path.

14. The apparatus described in claim 13, wherein the welder assembly has a weight of less than 100 pounds.

15. The apparatus described in claim 11, wherein the weld tips move in a substantially linear path.

16. An apparatus for welding a product including a weldable material, comprising:
 a fixture for positioning the product to be welded;
 a robot positioned adjacent the fixture and having a movable arm and a controller programmable to control movement of the arm; and
 a welder assembly including a mid-frequency DC transformer and a weld mechanism attached to the arm and operably connected to the mid-frequency DC transformer, the weld mechanism including a mounting plate, a pair of opposing weld tips movably mounted to the mounting plate for movement along a linear path on the mounting plate, and scissor arms pivotally mounted to the mounting plate and operably connected to the weld tips to oscillatingly move the weld tips along the linear path.

17. The apparatus described in claim 16, further including:
 a conveyor in communication with the fixture, such that the product can be conveyed into a position on the conveyer and then located within the fixture by a powered actuator.

18. The apparatus described in claim 17, wherein the powered actuator includes at least one fluid cylinder.

19. The apparatus described in claim 18, wherein the product includes a battery which includes a case having a top edge, and wherein the fixture mateably engages a top edge of the battery to locate the battery relative to the weld mechanism for welding the weldable material.

20. The apparatus described in claim 19, wherein the top edge includes a plurality of corners and the fixture mateably engages at least one of the corners.

21. The apparatus described in claim 17, wherein the product is a battery that includes a case having a top edge, and wherein the fixture mateably engages a top edge of the battery to locate the battery relative to the weld mechanism for welding the weldable material.

22. The apparatus described in claim 21, wherein the top edge includes a plurality of corners and the fixture mateably engages at least one of the corners.

23. A welding mechanism for a apparatus comprising:
 a mounting plate having two oval-shaped apertures extending therethrough;

a pair of opposing welding tips operably mounted for linear movement on the mounting plate and operable between an open non-welding position and a closed welding position;

a mid-frequency DC transformer in communication with the welding tips;

at least one actuator arm moveable between a first position corresponding to the open non-welding position of the welding tips and a second position corresponding to the closed welding position of the welding tips; and a pair of scissor arms operably attached to the at least one actuator arm and pivotally mounted to the mounting plate at a first point, each scissor arm operably attached to one of the welding tips and having a pivot boss connected to one side thereof which extends through one of the oval-shaped apertures of the mounting plate, such that the bosses are guided within the oval-shaped apertures of the mounting plate as the actuator arm is moved between the first position and the second position.

24. The welding apparatus of claim 23, wherein the welding mechanism is adapted to weld a weldable material having a relatively sharp melting point, such as lead or lead alloy for a battery.

25. The welding apparatus of claim 24, wherein the welding mechanism further includes a first stop operably mounted to the mounting plate and a second stop mechanically coupled to at least one of the scissor arms, the second stop limiting the position of the welding tips in the open non-welding position by contacting the first stop.

26. The welding apparatus of claim 25, wherein the position of the first stop block within the mounted plate is adjustable.

27. The welding apparatus of claim 26, wherein the position of the first stop block within the mounting plate is threadably adjustable.

28. The welding apparatus of claim 27, wherein the travel of the actuator arm is limited, thereby limiting the position of the welding tips in the closed welding position.

29. The welding apparatus of claim 28, wherein at least a portion of the actuator arm is threaded, travels in a linear motion, and is fitted with a threaded adjustment ring adapted to contact at least a portion of the mounting plate, thereby limiting the position of the welding tips in the closed welding position.

30. The welding apparatus of claims 29, wherein the welding mechanism further includes a first stop operably mounted to the mounting plate and a second stop mechanically coupled to at least one of the scissor arms, the second stop limiting the position of the welding tips in the open non-welding position by contacting the first stop.

31. The welding apparatus of claim 30, wherein the position of the first stop block within the mounted plate is adjustable.

32. The welding apparatus of claim 31, wherein the position of the first stop block within the mounting plate is threadably adjustable.

33. The welding apparatus of claim 23, wherein the travel of the actuator arm is limited, thereby limiting the position of the welding tips in the closed welding position.

34. The welding apparatus of claim 33, herein at least a portion of the actuator arm is threaded, travels in a linear motion, and is fitted with a threaded adjustment ring adapted to contact at least a portion of the mounting plate, thereby limiting the position of the welding tips in the closed welding position.

* * * * *

UNITED STATES PATENT AND TRADEMARK OFFICE
CERTIFICATE OF CORRECTION

PATENT NO.    : 6,288,356 B1
DATED         : September 11, 2001
INVENTOR(S)   : Harder et al.

Figure 10:
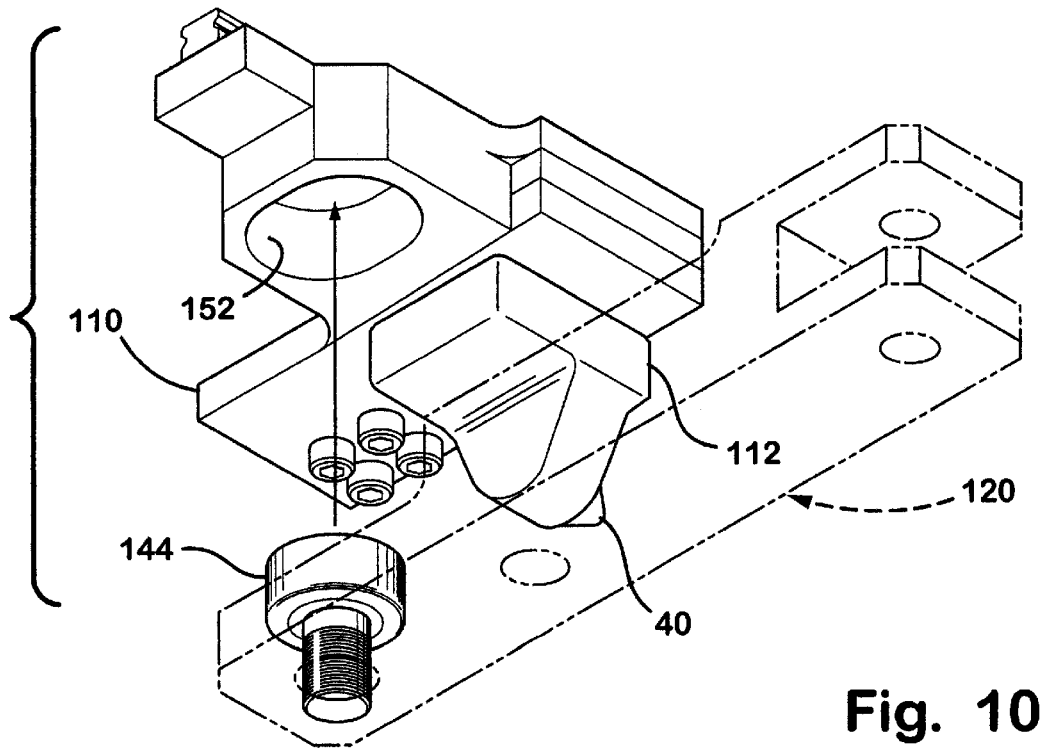
FIG. 10 is bottom perspective view of a guide block and a guide boss.
Figure 9:
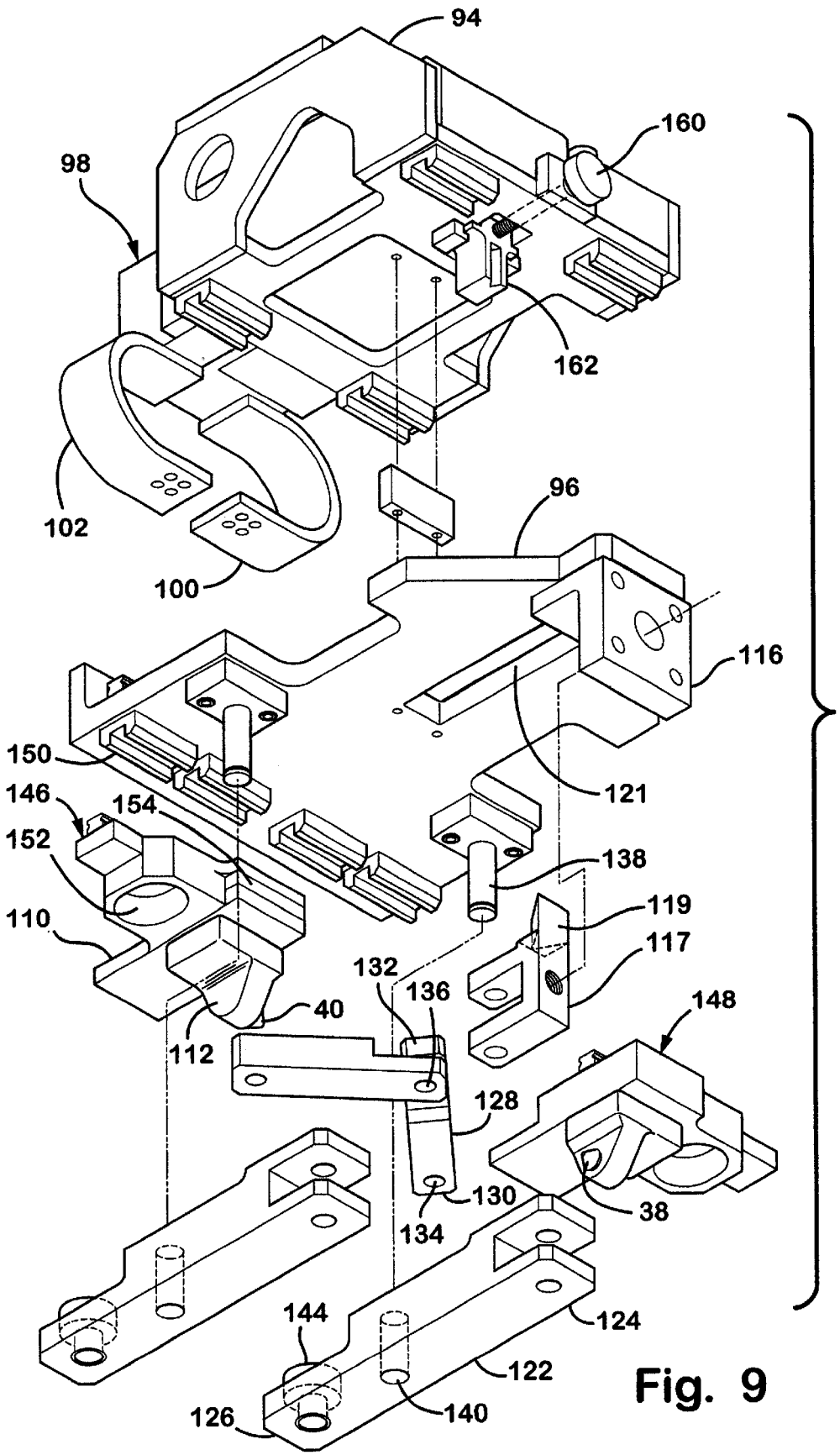
FIG. 9 is an exploded bottom perspective view of the weld mechanism.

It is certified that error appears in the above-identified patent and that said Letters Patent is hereby corrected as shown below:

<u>Title page,</u>
Item [57], ABSTRACT,
Line 8, "transformers" should be -- transformer --;

<u>Column 2,</u>
Line 3, "tend" should be -- tends --;
Line 18, "result" should be -- results --;

<u>Column 3,</u>
Line 55, after "Fig. 10 is" insert -- a --;

<u>Column 4,</u>
Line 31, before "welded" insert -- be --;
Line 33, after "mid-frequency DC transformer 34" insert -- via a mid-frequency DC controller (not shown) --;
Line 53, "Top plate 78" should be -- Top plate 58 --;

<u>Column 5,</u>
Line 46, "compassator" should be -- capacitor --;

<u>Column 6,</u>
Line 23, "well" should be -- weld --:
Line 32, "point" should be -- joint --;

<u>Column 7,</u>
Lines 60 and 61, "comer (or) comers" should be -- corner (or) corners --;

<u>Column 9,</u>
Lines 23 and 24, "taansformer" should be -- transformer --;

<u>Column 10,</u>
Line 9, "tranformer" should be -- transformer --;
Line 65, "before "apparatus" insert -- welding --;

<u>Column 11,</u>
Line 33, "mounted" should be -- mounting --;

UNITED STATES PATENT AND TRADEMARK OFFICE
CERTIFICATE OF CORRECTION

PATENT NO.    : 6,288,356 B1
DATED         : September 11, 2001
INVENTOR(S)   : Harder et al.

It is certified that error appears in the above-identified patent and that said Letters Patent is hereby corrected as shown below:

Column 12,
Line 13, "claims" should be -- claim --;
Line 27, "herein" should be -- wherein --.

Signed and Sealed this

Twenty-ninth Day of April, 2003

JAMES E. ROGAN
*Director of the United States Patent and Trademark Office*